(12) United States Patent
Lam et al.

(10) Patent No.: US 9,636,584 B2
(45) Date of Patent: *May 2, 2017

(54) MOBILE DEVICE INTERFACE FOR ONLINE GAMES

(75) Inventors: Serena Lam, San Francisco, CA (US); Kathleen Auterio, San Francisco, CA (US); Deniz Ersever, San Francisco, CA (US); Jackson Wang, San Francisco, CA (US); Benjamin Mullin, San Francisco, CA (US); Hardik Kheskani, Ahmedabad (IN)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/823,021

(22) Filed: Jun. 24, 2010

(65) Prior Publication Data

US 2011/0319169 A1   Dec. 29, 2011

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/55 | (2014.01) |
| A63F 13/792 | (2014.01) |
| A63F 13/335 | (2014.01) |

(52) U.S. Cl.
CPC ............ *A63F 13/55* (2014.09); *A63F 13/335* (2014.09); *A63F 13/792* (2014.09); *A63F 2300/204* (2013.01); *A63F 2300/407* (2013.01); *A63F 2300/5513* (2013.01)

(58) Field of Classification Search
CPC ......... A63F 13/30; A63F 13/323; A63F 13/35

USPC ............................................... 705/35; 463/42
See application file for complete search history.

(56) References Cited

U.S. PATENT DOCUMENTS

| | | | |
|---|---|---|---|
| 6,837,789 B2 * | 1/2005 | Garahi et al. ................... | 463/29 |
| 6,884,172 B1 | 4/2005 | Lloyd et al. | |
| 7,076,445 B1 | 7/2006 | Cartwright | |
| 7,222,078 B2 | 5/2007 | Abelow | |
| 2002/0059425 A1 | 5/2002 | Belfiore et al. | |
| 2002/0090985 A1 | 7/2002 | Tochner et al. | |
| 2002/0143625 A1 * | 10/2002 | Waldeyer ........................ | 705/14 |
| 2006/0293103 A1 | 12/2006 | Mendelsohn | |
| 2007/0233585 A1 * | 10/2007 | Ben Simon et al. ........... | 705/35 |
| 2008/0268929 A1 | 10/2008 | Billmaier et al. | |
| 2009/0147008 A1 | 6/2009 | Do et al. | |
| 2009/0253517 A1 | 10/2009 | Bererton | |
| 2009/0318221 A1 * | 12/2009 | Dhunjishaw et al. .......... | 463/29 |
| 2010/0022308 A1 * | 1/2010 | Hartmann et al. .............. | 463/42 |

(Continued)

FOREIGN PATENT DOCUMENTS

WO    WO-2011163615 A1    12/2011

OTHER PUBLICATIONS

U.S. Appl. No. 13/244,844, Non Final Office Action Mailed Dec. 19, 2011, 9 pgs.

(Continued)

*Primary Examiner* — Milap Shah
*Assistant Examiner* — Jason Pinheiro
(74) *Attorney, Agent, or Firm* — Schwegman Lundberg & Woessner, P.A.

(57) ABSTRACT

The present disclosure generally relates games and applications in general and in particular to computer-implemented online games playable on mobile devices.

28 Claims, 6 Drawing Sheets

(56) References Cited

U.S. PATENT DOCUMENTS

| | | |
|---|---|---|
| 2010/0069148 A1 | 3/2010 | Cargill |
| 2010/0317423 A1 | 12/2010 | Osborne |
| 2011/0250951 A1 | 10/2011 | Van Luchene |
| 2012/0015743 A1 | 1/2012 | Lam et al. |
| 2013/0079131 A1 | 3/2013 | Lam et al. |
| 2016/0296841 A1 | 10/2016 | Lam et al. |

OTHER PUBLICATIONS

U.S. Appl. No. 13/244,857, Non Final Office Action mailed Feb. 3, 2012, 11 pgs.
U.S. Appl. No. 13/244,865, Non Final Office Action mailed Mar. 15, 2012, 13 pgs.
International Application Serial No. PCT/US2011/041872, Search Report mailed Nov. 14, 2011, 3 pgs.
International Application Serial No. PCT/US2011/041872, Written Opinion mailed Nov. 14, 2011, 5 pgs.
"U.S. Appl. No. 13/244,844, Final Office Action mailed Jun. 18, 2012", 10 pgs.
"U.S. Appl. No. 13/244,844, Response filed Mar. 19, 2012 to Non Final Office Action mailed Dec. 19, 2011", 8 pgs.
"U.S. Appl. No. 13/244,857, Final Office Action mailed May 24, 2012", 10 pgs.
"U.S. Appl. No. 13/244,865, Response filed Jun. 15, 2012 to Non Final Office Action mailed Mar. 15, 2012", 11 pgs.
"U.S. Appl. No. 13/244,857, Appeal Brief filed Feb. 28, 2013", 13 pgs.
"U.S. Appl. No. 13/244,865, Non Final Office Action mailed May 2, 2013", 15 pgs.
"U.S. Appl. No. 13/244,844, Response filed Aug. 30, 2012 to Non Final Office Action mailed Jun. 18, 2012", 10 pgs.
"U.S. Appl. No. 13/244,857, Non Final Office Action mailed Oct. 1, 2012", 10 pgs.
"U.S. Appl. No. 13/244,857, Response filed May 3, 2012 to Non Final Office Action mailed Feb. 3, 2012", 10 pgs.
"U.S. Appl. No. 13/244,857, Response filed Aug. 24, 2012 to Final Office Action mailed May 24, 2012", 10 pgs.
"U.S. Appl. No. 13/244,865 , Appeal Brief filed Jan. 29, 2013", 17 pgs.
"U.S. Appl. No. 13/244,865, Final Office Action mailed Aug. 30, 2012", 13 pgs.
"International Application Serial No. PCT/US2011/041872, International Preliminary Report on Patentability mailed Nov. 14, 2011", 6 pgs.
"U.S. Appl. No. 13/244,844, Examiner Interview Summary mailed Dec. 3, 2013", 4 pgs.
"U.S. Appl. No. 13/244,844, Non Final Office Action mailed Oct. 7, 2013", 13 pgs.
"U.S. Appl. No. 13/244,844, Response filed Jan. 7, 2014 to Non-Final Office Action dated Oct. 7, 2013", 13 pgs.
"U.S. Appl. No. 13/244,857, Final Office Action mailed May 8, 2014", 10 pgs.
"U.S. Appl. No. 13/244,857, Non Final Office Action mailed Oct. 2, 2013", 12 pgs.
"U.S. Appl. No. 13/244,857, Response filed Jan. 21, 2014 to Non-Final Office Action dated Oct. 2, 2013", 10 pgs.
"U.S. Appl. No. 13/244,865, Examiner Interview Summary mailed Sep. 19, 2013", 3 pgs.
"U.S. Appl. No. 13/244,865, Final Office Action mailed Feb. 24, 2014", 17 pgs.
"U.S. Appl. No. 13/244,865, Response filed Oct. 28, 2013 to Non Final Office Action mailed May 2, 2013", 9 pgs.
Cardwell-Winters, Kellie, "Happy Aquarium: Walkthrough, Cheats and Strategy Guide", [Online] Retrieved From Internet: <http://www.gamezebo.com/games/happy-aquarium/walkthrough-cheats-strategy-guide>, (Feb. 20, 2010), 38 pgs.
"3 Day Feeder and XP", [Online] retrieved from the internet: <<http://forums.crowdstar.com/viewtopic.php?p=32179&sid=b310564dd05be2a8be49ad6ffb37bca7>, (Oct. 14, 2009), 3 pgs.
"U.S. Appl. No. 13/244,844, Final Office Action mailed Jul. 9, 2014", 14 pgs.
"U.S. Appl. No. 13/244,857, Non Final Office Action mailed Sep. 29, 2014", 11 pgs.
"U.S. Appl. No. 13/244,857, Response filed Aug. 8, 2014 to Final Office Action dated May 8, 2014", 11 pgs.
"U.S. Appl. No. 13/244,865, Examiner Interview Summary mailed Apr. 30, 2014", 4 pgs.
"U.S. Appl. No. 13/244,865, Response filed May 15, 2014 to Final Office Action mailed Feb. 24, 2014", 11 pgs.
Kroeger, Rob, "A new mobile Gmail experience for iPhone and Android", [Online] retrieved from the internet: <<Mobilehttp://gmailblog.blogspot.com/2009/04/new-mobile-gmail-experience-for-iphone.html>, (Apr. 9, 2007), 3 pgs.
"U.S. Appl. No. 13/244,844, Non Final Office Action mailed Apr. 9, 2015", 10 pgs.
"U.S. Appl. No. 13/244,857, Non Final Office Action mailed Apr. 10, 2015", 16 pgs.
"U.S. Appl. No. 13/244,857, Response filed Jan. 29, 2015 to Non-Final Office Action mailed Sep. 29, 2014", 10 pgs.
"U.S. Appl. No. 13/244,865, Non Final Office Action mailed Mar. 3, 2015", 17 pgs.
"U.S. Appl. No. 13/244,865, Response filed Aug. 3, 2015 to Non Final Office Action mailed Mar. 3, 2015", 11 pgs.
"U.S. Appl. No. 13/244,844, Examiner Inverview Summary mailed Mar. 31, 2016", 3 pgs.
"U.S. Appl. No. 13/244,857, Advisory Action mailed May 16, 2016", 3 pgs.
"U.S. Appl. No. 13/244,857, Respones filed Jun. 15, 2016 to Advisory Action mailed May 16, 2016", 13 pgs.
"U.S. Appl. No, 13/244,865, Advisory Action mailed May 18, 2016", 3 pgs.
"U.S. Appl. No. 13/244,865, Examiner Interview Summary mailed Apr. 7, 2016", 6 pgs.
"U.S. Appl. No. 13/244,865, Response filed Apr. 26, 2016 to Final Office Action mailed Mar. 9, 2016", 11 pgs.
"U.S. Appl. No. 13/244,857, Non Final Office Action mailed Sep. 21, 2016", 6 pgs.
"U.S. Appl. No. 13/244,857, Response filed Dec. 21, 2016 to Non Final Office Action mailed Sep. 21, 2016", 9 pgs.
"U.S. Appl. No. 15/096,875, Preliminary Amendment filed Jul. 11, 2016", 7 pgs.

* cited by examiner

MOBILE DEVICE INTERFACE FOR ONLINE GAMES

TECHNICAL FIELD

The present disclosure generally relates to games and applications in general and in particular to computer-implemented online games playable on mobile devices.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game actions that a player character can make within the game. For example, a player character in an online role-playing game may be able to interact with other player characters, build a virtual house, attack enemies, go on a quest, go to a virtual store to buy/sell virtual items, etc. A player character in an online poker game may be able to play at specific tables, place bets of virtual currency for certain amounts, play or fold certain hands, play in a online poker tournament, etc.

Internet users typically access online games using browser clients (e.g., Firefox, Chrome, Internet Explorer, etc.). Many mobile client systems (e.g., cellular phones, personal digital assistants, computer tablets, etc.) can access and run various computer games. Some mobile systems can access the Internet, allowing the user to play online games. Mobile client users typically access online games using browser clients or using custom applications for accessing the game.

DESCRIPTION OF EXAMPLE EMBODIMENTS

Game Systems

Figure 1:
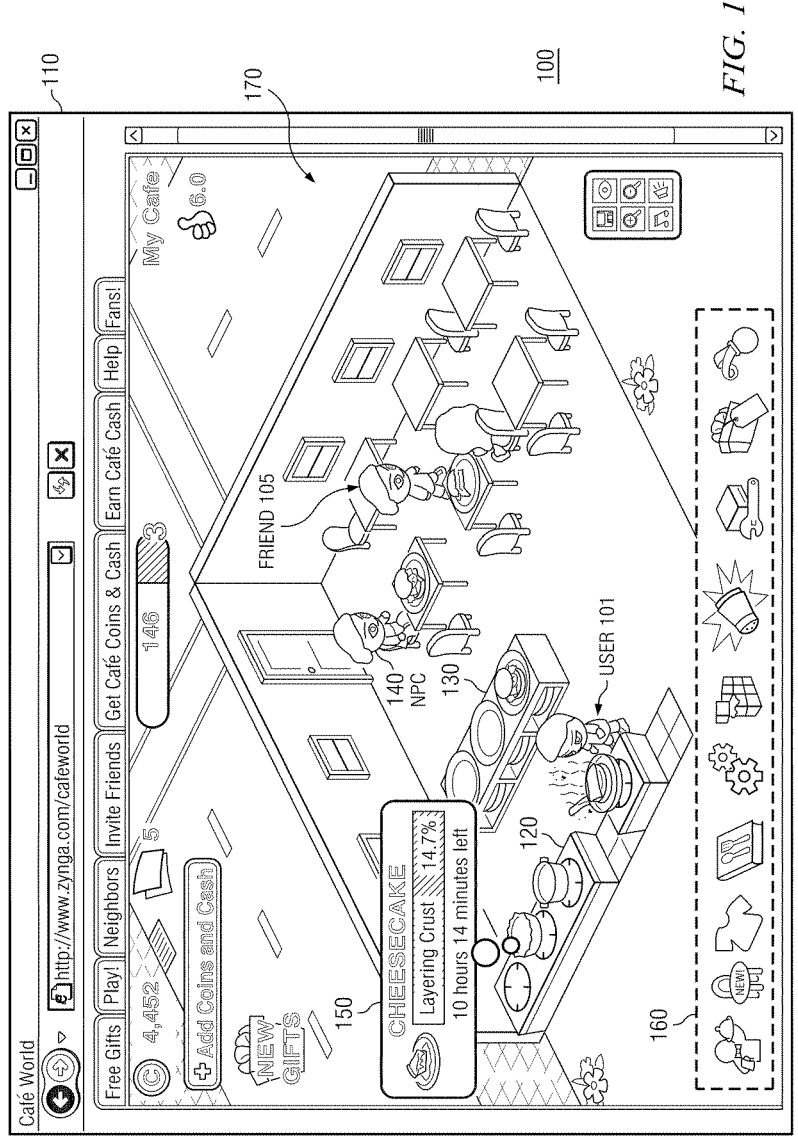
FIG. 1 illustrates an example of a game interface for an online game accessed by a browser client.

In an online game, players control player characters (PCs), a game engine controls non-player characters (NPCs), game elements, and other game features, and the game engine also manages player character state. A player character can engage in one or more in-game actions, wherein the game actions may effect game state. As used herein, the term "player character state" can refer to one or more in-game characteristics of a player character, such as location, assets, levels, condition, health, status, inventory, skill set, name, orientation, affiliation, specialty, and so on. As used herein, the term "game state" can refer to one or more in-game characteristics of any in-game element, including player character state, NPC state, virtual item state, game feature state, game environment state, etc.

A game event may be an outcome of an engagement, a provision of access, rights and/or benefits, or the obtaining of some assets (e.g., health, money, strength, inventory, land, etc.). A game engine determines the outcome of a game event according to a variety of factors, such as the game rules, a player character's in-game actions, player character state, game state, interactions of other player characters, and random calculations. Engagements can include simple tasks (e.g., plant a crop, clean a stove), complex tasks (e.g., build a farm, run a café), or other events.

An online game can be hosted by a game networking system 320, which can be accessed over any suitable network with an appropriate client system 330. A player may have a game system account on game system 320, wherein the game system account can contain a variety of information about the player (e.g., the player's personal information, player character state, game state, etc.). In various embodiments, an online game can be embedded into a third-party website. The game can be hosted by the networking system of the third-party website, or it can be hosted on game system 320 and merely accessed via the third-party website. The embedded online game can be hosted solely on a server of game system 320 or using a third-party vendor server. In addition, any combination of the functions of the present disclosure can be hosted on or provided from any number of distributed network resources. For example, one or more executable code objects that implement all or a portion of the game can be downloaded to a client system for execution.

Virtual Currency

In various embodiments, players within the game can acquire virtual currency. In such games, the virtual currency might be represented by virtual coins, virtual cash, or by a number or value stored by the server for that player's benefit. Such virtual currency represents units of value for use in the online game system, and is analogous to legal currency. Virtual currency can be purchased in one or more actual cash or credit transactions by a player, where the legal currency is transferred using a credit/debit/charge card transaction conveyed over a financial network. In some embodiments, a player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

In some embodiments, virtual currency can be used to purchase one or more in-game assets or other benefits. For example, a player may be able to exchange virtual currency for a desired level, access, right, or item in an online game. In one embodiment, legal currency can be used to directly purchase an in-game asset or other benefit. The player can select the desired in-game asset or other benefit. Once the necessary selections are made, the player can place the order to purchase the in-game asset or other benefit. This order is received by the game system 320, which can then process the order. If the order is processed successfully, an appropriate financial account associated with the player can be debited by the amount of virtual currency or legal currency needed to buy the selected in-game asset or other benefit.

In some embodiments, multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual farmhouse for $10 in virtual cash, but may not purchase the virtual farmhouse for virtual gold coins alone. In some embodiments, certain types of virtual currency can be acquired by engaging in various in-game actions while other types of virtual currency can only be acquired by exchanging legal currency. For example, a player may be able to acquire virtual gold coins by growing and selling virtual crops, but can only acquire virtual cash by exchanging legal currency.

Harvest Mechanic

In various embodiments, an online game can include a series of user-initiated in-game actions that comprise a harvest mechanic. The harvest mechanic generally has two components: a set of initiating actions and a set of collecting actions. In an initiating action, a player may "click" or otherwise interact with an element of the online game to initiate the harvest mechanic. In some games, multiple clicks or other actions may be necessary to complete the initiating action. For example, a player may have to click on a stove to clean it and click again to prepare ingredients and initiate cooking virtual food. In another example, a player may have to click on land to plow it and click again to plant seeds and initiate growing virtual crops.

Once the initiating action is complete, the online game may begin a processing action, wherein the game state of the element is modified by the game system during some time period. The time period can range from seconds to days, depending on the game system. For example, the game system may require an hour for virtual food to get cooked, or it may require three days for a virtual crop to grow. During the processing action, the player may be able to cancel the action, the player may also be able to interact with the element. For example, the player could add spice to his virtual food while it is cooking, or the player could add fertilizer to his virtual crops while they are growing. These interactions may or may not have an in-game effect on the element. In some embodiments, there is no processing action, and the collecting action is accessible immediately after the initiating action is complete. In other embodiments, the processing action is instantaneous.

After the processing action is complete, the game system can alter the game state of the element. At this point, the collecting action may be available. In a collecting action, a player may click or otherwise interact with the element to complete the harvest mechanic. For example, a player may have to click on the fully-cooked virtual food to serve it. In another example, a player may have to click on fully-grown crops to harvest them. In some games, multiple clicks or other actions may be necessary to complete the collecting action.

Once the collecting action is complete, the harvest mechanic may be reset with respect to that game element. In some embodiments, the player may have to click or otherwise interact with the element to reset the harvest mechanic. In other embodiments, the harvest mechanic may reset automatically once the collecting action is complete. Once the harvest mechanic is reset, the initiating action may be available again for that game element.

Two detailed examples of the harvest mechanic follow.

FarmVille Example

In one embodiment, a user controls a player character on a virtual farm in Zynga's FarmVille online game. The player (via his player character) can build and maintain the virtual farm. The player can plants seeds, which grow into crops, which can be harvested to earn virtual currency. Animals and trees can also be purchased and can also be raised and harvested for profits.

To grow crops, a player must first select a plot of land to plow. When the player clicks on the plot of land, his player character will move over to the plot of land and plow it. Once the player character finishes plowing the land, the player can select a type of seed to plant (e.g., pumpkin, wheat, etc.). Each type of seed indicates its cost in virtual currency and the time necessary for it to grow into a harvestable crop. For example, raspberry seeds have a two hour growth time and cost 20 virtual coins. Watermelon seeds have a four day growth time and cost 130 virtual coins. The player can then click on the land, and his player character will move to the plot of land and plant the seeds, thereby completing the initiating action. The player's game account is also debited by the amount of virtual coins needed to buy the seeds.

Once the seeds are planted, the processing action begins, and the game engine indicates that the seeds are growing. By clicking on the growing crop, the player can view how much time is remaining in the processing action.

Once the growth time has elapsed, the processing action will end and the game engine will modify the crops into fully-grown harvestable crops. The player can then click on the crops to harvest them and sell them for virtual coins. For example, raspberries yield 46 virtual coins per plot and watermelons yield 348 coins. This completes the collecting action.

If the crop is not harvested within a specific time, it will wilt and must be plowed again, unless the unwither feature is applied. For example, pumpkins will grow in 8 hours. If the pumpkins are not harvested within 16 hours of planting, they will wither and die, and the player will not be able to harvest them for virtual coins, unless the unwither feature is applied. To gain access to the unwither feature, the player may spend legal currency to buy virtual cash, which can then be used to buy the unwither feature.

Café World Example

In another embodiment, a user controls a player character in a virtual café in Zynga's Café World online game. The player (via his player character) can build and maintain the virtual café. The player can prepare and cook virtual food, serve it to virtual customers (NPCs), and build and modify the virtual café.

To prepare food, a player must first select a dirty stove. When the player clicks on the stove, his player character will move to the stove and clean it. Once the player character finishes cleaning the stove, the player can select the Dish Menu to choose the type of dish to prepare (e.g., pumpkin pie, cheesecake, soup, hamburgers, etc.). Each type of dish indicates its cost in virtual currency and the time necessary for it to cook into a servable dish. For example, cheeseburgers have a 5 minutes cooking time and cost 15 virtual coins. Cheesecake has a 12 hour cooking time and costs 400 virtual coins. The player can then click on the stove and his player character will move to the stove and begin cooking. The player's game account is also debited by the amount of virtual coins needed to buy the dish. Depending on the dish, the player may have to click one or more additional times to prepare ingredients for the dish. The initiating action to begin cooking will be complete once the player character has prepared the appropriate number of ingredients.

Once the dish begins cooking, the processing action begins, and the game engine indicates that the dish is cooking. By clicking on the cooking dish, the player can view how much time is remaining in the processing action. The player can also click on the cooking dish to cancel the dish and reset the harvest mechanic for that stove.

Once the cooking time has elapsed, the processing action will end and the game engine will modify the dish into a fully-cooked virtual dish that can be served. The player can then click on the cooked dish, which causes the player character to pick up the dish and move it to a serving counter. Serving the dishes is done automatically by the game engine, which controls waiters (NPCs), who serve the dishes to the virtual customers and thereby earn virtual coins. For example, a dish of cheeseburgers yield 52 virtual coins and cheesecake yields 1640 virtual coins. Moving the dish to the serving counter completes the collecting action and resets the harvest mechanic for that stove. After the dish is served, the game engine will indicate that the stove is dirty. If the dish is not served within a specific time, it will rot and the stove will have to be cleaned again, resetting the harvest mechanic.

Game Interfaces

FIG. 1 illustrates an example of a webpage-based game interface for an online game accessed by a browser client 110 (e.g., Firefox, Chrome, Internet Explorer, etc.). In various embodiments, a user of a client system 330 can use a browser client 110 to access the online game over the Internet (or other suitable network). The game interface 170 illustrated in FIG. 1 may be automatically generated and presented to the user in response to the user visiting or accessing the game operator's website or a third-party's website from client system 330 with a browser client 110. Game system 320 can transmit data to client system 330 allowing it to display game interface 170, which is typically some type of graphic user interface. For example, the webpage downloaded to client system 330 may include an embedded call that causes client system 330 to download an executable object, such as a Flash .SWF object, which executes on client system 330 and renders the game within the context of the webpage. Other interface types are possible, such as server-side rendering and the like. Game interface 170 is configured to receive signals from the user via client system 330. For example, the user can click on game interface 170, or enter commands from a keyboard or other suitable input device. The game engine can respond to these signals to allow game play. The display of game interface 170 can change based on the output of the game engine, the input of the player, and other signals from game system 320 and client system 330.

The game interface 170 can display various game components, such as the game environment, options available to the player (e.g., in-game actions, preferences, settings, etc.), game results, etc. Some components of the game interface may be static, while others may be dynamic (e.g., changing with game play). The user may be able to interact with some components (e.g., player character 101, NPCs, etc.) and not interact with other components (e.g., the background of the virtual world, such as the virtual street or sidewalk). The user can control player character 101 and cause player character 101 to engage in specific in-game actions or activities by providing input to game interface 170.

In the example online game illustrated in FIG. 1, the user controls player character 101 in a virtual café in Zynga's Café World online game. Game interface 170 shows the virtual café and various components of the café. Player character 101 can move around the café to interact with various elements of the café, such as the virtual stoves 120 and virtual serving counters 130. The user can click on (or otherwise activate) various aspects of the game interface to provide instructions to the game engine. For example, by clicking on the virtual stove 120, the user can cause player character 101 to move over to the stove and to begin preparing a dish. Once the dish if fully-cooked, the user can click on the virtual stove 120, causing player character 1010 to take the prepared dish from stove 120 and to move it to a serving counter 130.

The user can also click on various icons in game interface 170 to activate various game options. For example, if the user clicks on one of the icons in option bar 160, the game engine will alter the game interface 170 to present the user with options for buying and selling virtual items for use in the virtual café. For example, the player could buy or sell virtual furniture, appliances, décor, windows, etc. Similarly, the user can click on other icons in option bar 160 to access other game options.

One skilled in the art would appreciate that FIG. 1 is presented merely as an example of an embodiment of one type of online game and that the present disclosure is intended to encompass a variety of game types, including gambling games, role-playing games, puzzle games, etc.

Game Interfaces on Mobile Devices

A player of an online game may want to have access to a particular online game on both an internet client system and a mobile client system. For example, a user may want to play an online role-playing game (e.g., Zynga's Café World) from his desktop computer while at home and from his cellular phone while travelling. Many mobile client systems have browser clients with the ability to access webpages on the Internet. However, certain limitations of mobile client systems (e.g., size, limited memory, limited data transfer rates, etc.) may make it desirable to a use a specially designed game interface to access the game from mobile client systems that accommodates these limitations.

Figure 2A:
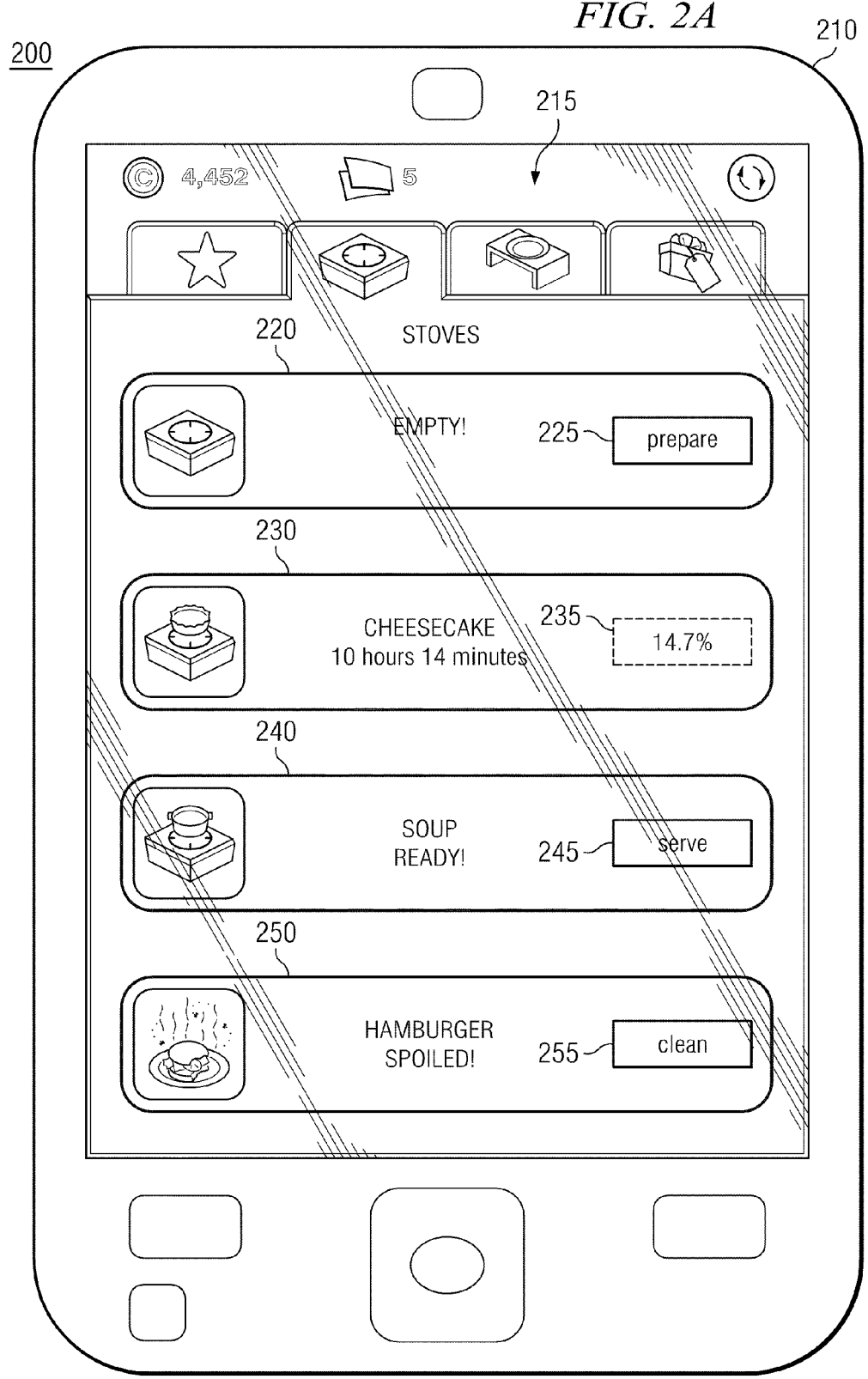
FIG. 2A illustrates an example of a game interface for an online game accessed by a mobile client system.
Figure 2B:
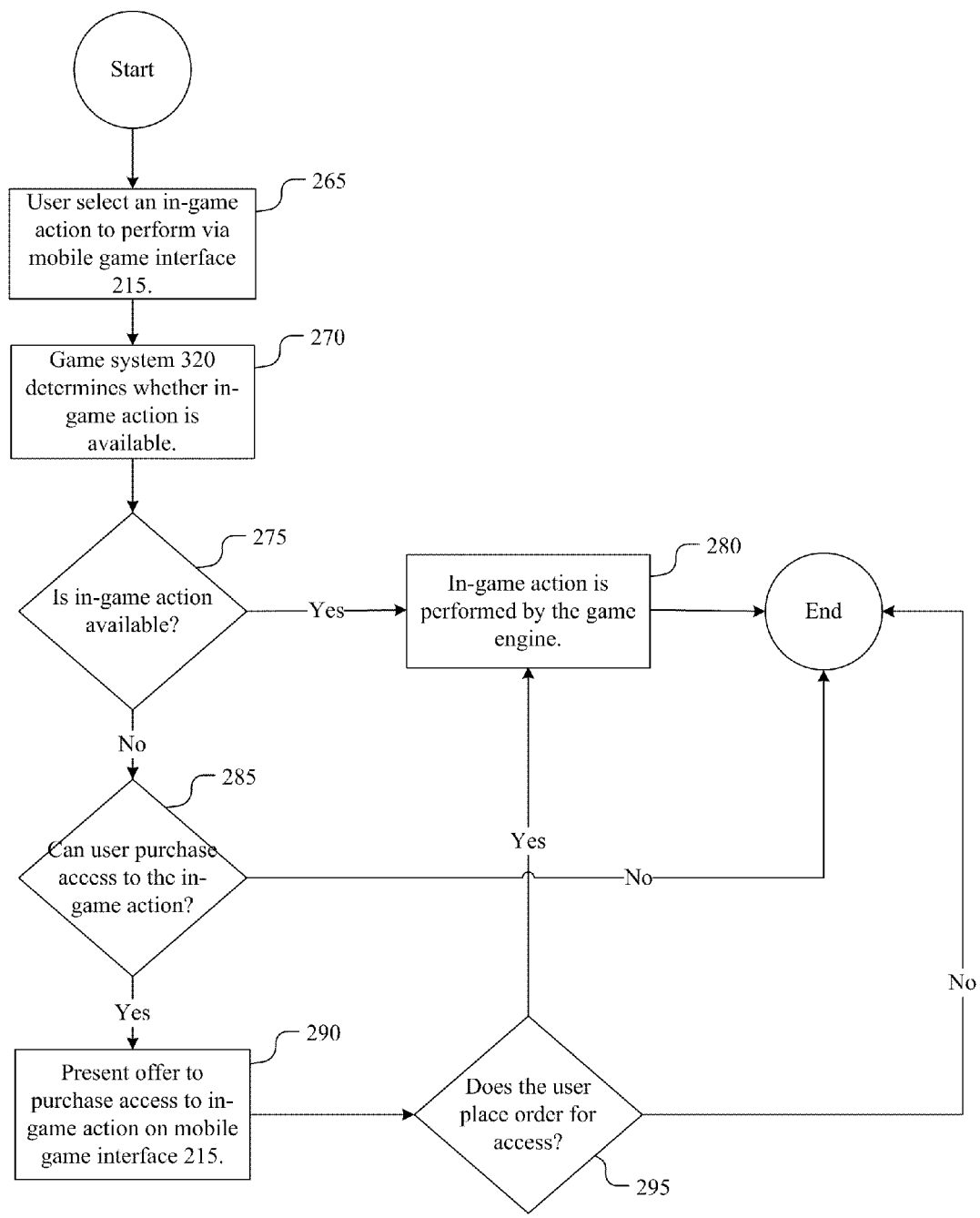
FIG. 2B shows a flowchart illustrating a process for accessing in-game actions on a mobile game interface.

FIG. 2A illustrates an example of a game interface for an online game accessed by a client system 330 over a mobile network. FIG. 2B shows a flowchart illustrating a process for accessing various in-game actions on mobile game interface 215. The game interface 215 may be provided in a structured document and processed by a mobile browser of a client system, or may be provided by a dedicated client application hosted on the mobile device itself.

FIG. 2A illustrates a client system 210 that is a smart phone, however any mobile client system may be used (e.g., cellular phones, personal digital assistants, computer tablets, etc.). In various embodiments, a user of mobile client system 210 can use a browser client or other application to access an online game over a mobile network (or other suitable network). The mobile game interface 215 illustrated in FIG. 2A may be automatically generated and presented to the user in response to the user visiting or accessing the game operator's website, a third-party website, or executing an application on mobile client system 210. Mobile game interface 215 operates analogously to game interface 170. For example, the user can click, touch, or otherwise interact with mobile game interface 215 to select various in-game actions to perform at step 265. If this in-game action is available, the game engine can perform the action at step 280.

In various embodiments, mobile game interface 215 may limit the in-game actions and other options available to the user. For example, in FIG. 2A, the user controls his player character in a virtual café in Zynga's Café World online game. Unlike game interface 170 in FIG. 1, which shows the entire virtual café, mobile game interface 215 only shows certain components from the virtual café. Specifically, FIG. 2A shows a representation of the stoves 120 from FIG. 1. The user can interact with the stoves to initiate certain in-game actions. For example, by clicking on virtual stove 220's action button 225, the user can cause his player character to begin preparing a dish. Or by clicking on virtual stove 240's action button 245, the user can cause his player character to serve a prepared dish.

In some embodiments, certain in-game actions, such as the harvest mechanic, may be restricted or otherwise unavailable. These are so-called "restricted in-game actions." Game system 320 can cause one or more in-game actions to be restricted in-game actions when the online game is played on game interface 215. For example, in FIG. 2A, only the "serve" option may be available through mobile game interface 215, while the "clean" and "prepare" options may be disabled. To activate these restricted in-game actions, the user may have to access the online game on the Internet through a browser client 110. In one embodiment, one or more restricted in-game actions can be enabled or activated from mobile game interface 215 if the user exchanges some amount of virtual currency or legal currency. For example, the "prepare" action may be a restricted in-game action on mobile game interface 215, but the user can pay $5 in virtual cash to enable a single use of the action on that interface.

In some embodiments, certain in-game actions may be available when accessing mobile game interface 215 that are not available when accessing game interface 170. These in-game actions may allow the user to perform certain in-game actions more conveniently or quickly. These are so-called "convenience in-game actions." For example, a user playing Zynga's Café World on mobile client system 210 may have a plurality of virtual stoves with dishes that are prepared and ready to serve. Normally, the user would have to click on each stove individually to have his player character perform the serve action for each dish. However, mobile game interface 215 may give the user the option to click on one button that causes the game engine to serve all dishes that are currently ready to serve. In one embodiment, one or more convenience in-game actions can be activated only if the user exchanges virtual currency or legal currency. For example, the "serve" action may normally require the user to click on each stove with a ready dish on mobile game interface 215, but the user can pay $2 in legal currency to cause the game engine to serve all dishes that are currently ready to serve.

To access restricted in-game actions or convenience in-game actions, the game system can first determine whether the selected action is available at step 275. If the selected in-game action is available, the game engine can perform the action at step 280. However, if it is not currently available, game system 320 can then determine whether the user may purchase access to the in-game action by exchanging virtual currency or legal currency at step 285. If access can be purchased, game system 330 can present an offer to the user to purchase access to the selected restricted in-game action or convenience in-game action at step 290. If the user purchases access at step 295, the game engine can then perform the action at step 280 and the user's account can be debited the appropriate amount of virtual or legal currency. However, if access cannot be purchased at step 285, or if access is not purchased at step 295, then the game system will not perform the action and may inform the user that the in-game action was not performed and/or that the selected in-game action is not available.

One skilled in the art would appreciate that FIGS. 2A and 2B are presented merely as an example of an embodiment of one type of online game on one type of client system and that the present disclosure is intended to encompass a variety of game types that offer a variety of in-game actions on a variety of client systems.

Data Flow

Figure 3:
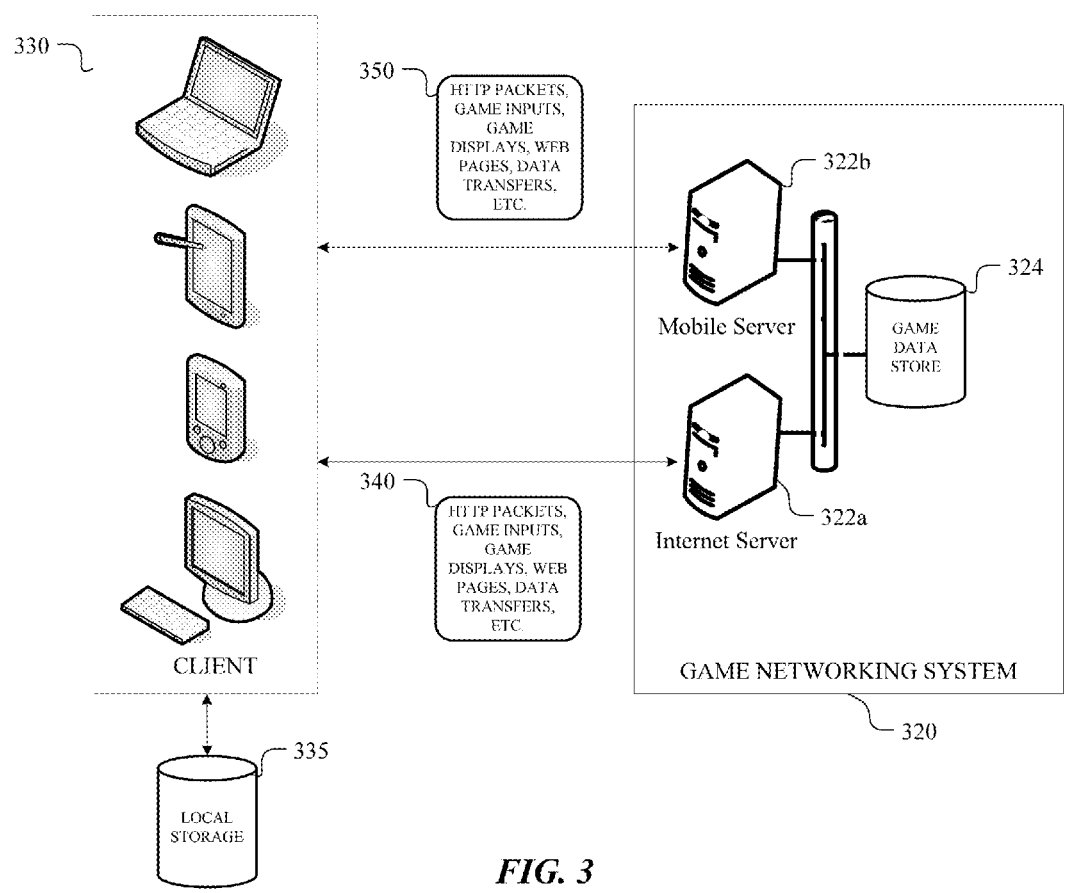
FIG. 3 depicts a schematic of a system and data flow.

FIG. 3 depicts a schematic of system 300 and data flow between the components of system 300. System 300 can include a client system 330 and a game networking system 320. Client system 330 and game networking system 320 can each have a corresponding data store such as local storage medium 335 and game data storage medium 324, respectively. Game networking system 320 can also have one or more servers that can communicate with client system 330 over an appropriate network. Game networking system 320 can have an internet server 322A for communicating with client system 330 the Internet. Similarly, game networking system 320 can have a mobile server 322B for communicating with client system 330 via a mobile network (e.g., GSM, PCS, Wi-Fi, WPAN, etc.). In some embodiments, one server may be able to communicate with client system 330 over both the Internet and a mobile network. In other embodiments, separate servers can be used.

Client system 330 can communicate with game networking system 320 to receive webpages, messages, transmit data to and receive data 340, 350 (e.g., game inputs, web pages, data transfers, etc.) from game networking system 320. In a similar fashion, game networking system 320 can communicate data packets 340, 350, including HTTP packets, data requests, transaction information, updates, etc. At some other time, or at the same time, game networking system 320 can communicate data (e.g., game state information, game system account information, page info, messages, etc.) with other networking systems, such as a social networking system (e.g., Facebook, Myspace, etc.).

Communication between client system 330 and game networking system 320 can occur over any appropriate electronic communication medium or network using any suitable communications protocols. For example, client system 330, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. Still further, in particular implementations, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In one implementation, for example, a client request may cause a server to respond with a first data object, such as an HTML page, which itself refers to other data objects. A client application, such as a browser, will request these additional data objects as it parses or otherwise processes the first data object.

Systems and Methods

In various example embodiments, one or more described webpages may be associated with a networking system or networking service. However, alternate embodiments may have application to the retrieval and rendering of structured documents hosted by any type of network addressable resource or web site. Additionally, as used herein, a "user" may be an individual, a group, or an entity (such as a business or third party application).

Figure 4:
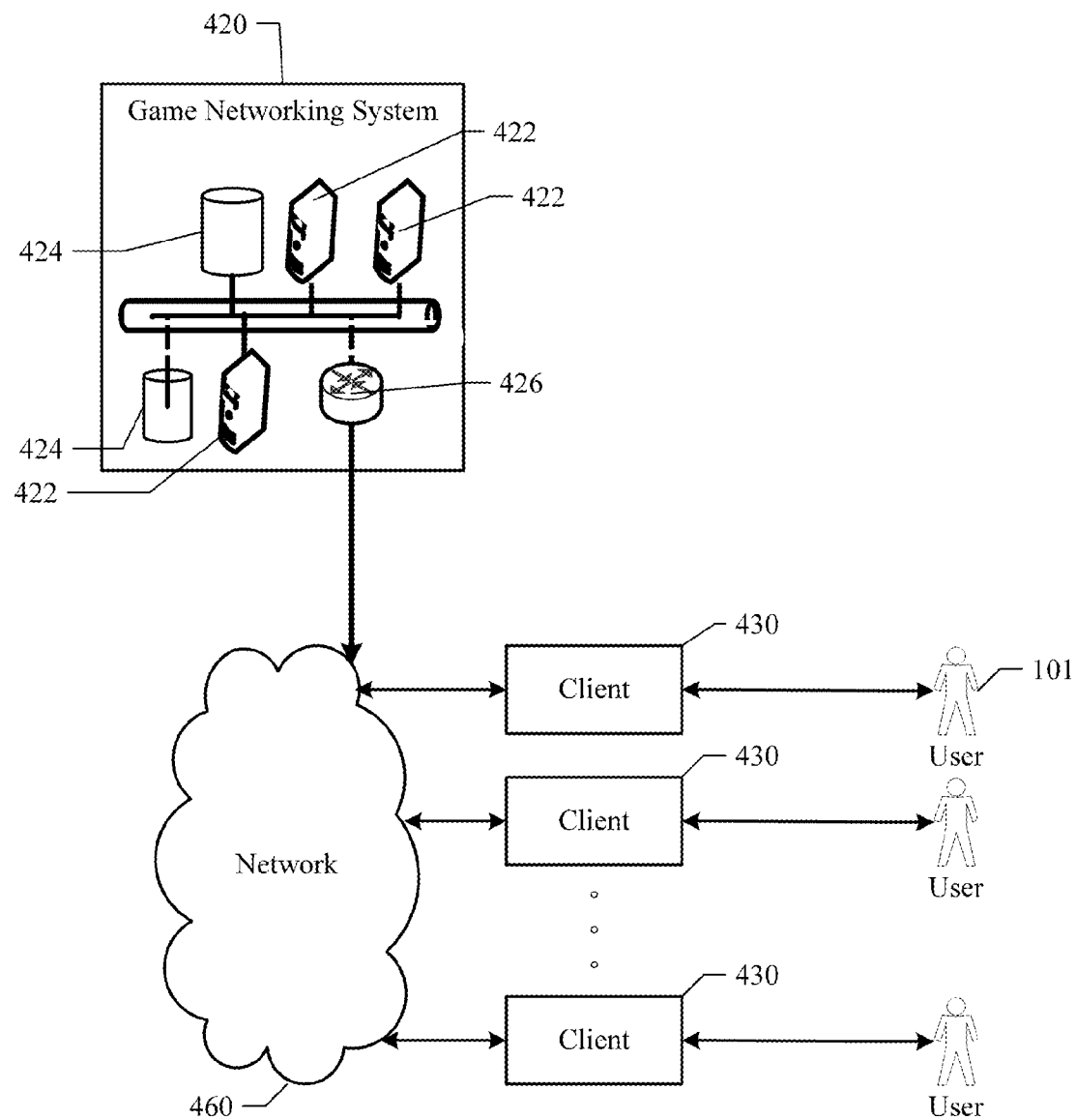
FIG. 4 illustrates an example network environment.

Particular embodiments may operate in a wide area network environment, such as the Internet, including multiple network addressable systems. FIG. 4 illustrates an example network environment, in which various example embodiments may operate. Network cloud 460 generally represents one or more interconnected networks, over which the systems and hosts described herein can communicate. Network cloud 460 may include packet-based wide area networks (such as the Internet), private networks, wireless networks, satellite networks, cellular networks, paging networks, and the like. As FIG. 4 illustrates, particular embodiments may operate in a network environment comprising one or more networking systems, such as game networking system 420, and one or more client devices 430. Client devices 430 are operably connected to the network environment via a network service provider, a wireless carrier, or any other suitable means.

Game networking system 420 is a network addressable system that, in various example embodiments, comprises one or more physical servers 422 and data stores 424. The one or more physical servers 422 are operably connected to computer network 460 via, by way of example, a set of routers and/or networking switches 426. In an example embodiment, the functionality hosted by the one or more physical servers 122 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 422 may host functionality directed to the operations of game networking system 420. Hereinafter servers 422 may be referred to as server 422, although server 422 may include numerous servers hosting, for example, game networking system 420, as well as other content distribution servers, data stores, and databases. Data store 424 may store content and data relating to, and enabling, operation of the game networking system 420 as digital data objects. A data object, in particular implementations, is an item of digital information typically stored or embodied in a data file, database or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 424 corresponds to one or more of a variety of separate and integrated databases, such as relational databases and object-oriented databases, that maintain information as an integrated collecting of logically related records or files stored on one or more physical systems. Structurally, data store 424 may generally include one or more of a large class of data storage and management systems. In particular embodiments, data store 424 may be implemented by any suitable physical system(s) including components, such as one or more database servers, mass storage media, media library systems, storage area networks, data storage clouds, and the like. In one example embodiment, data store 424 includes one or more servers, databases (e.g., MySQL), and/or data warehouses. Data store 424 may include data associated with different game networking system 420 users and/or client devices 430.

Client device 430 is generally a computer or computing device including functionality for communicating (e.g., remotely) over a computer network. Client device 430 may be a desktop computer, laptop computer, personal digital assistant (PDA), in- or out-of-car navigation system, smart phone or other cellular or mobile phone, or mobile gaming device, among other suitable computing devices. Client device 430 may execute one or more client applications, such as a web browser (e.g., Microsoft Internet Explorer, Mozilla Firefox, Apple Safari, Google Chrome, and Opera, etc.), to access and view content over a computer network. In particular implementations, the client applications allow a user of client device 430 to enter addresses of specific network resources to be retrieved, such as resources hosted by networking system 420. These addresses can be Uniform Resource Locators, or URLs. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications and other objects that can be embedded within the page. Generally, a webpage may be delivered to a client as a static document, however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client device 430 desires to view a particular webpage (hereinafter also referred to as target structured document) hosted by game networking system 420, the user's web browser, or other document rendering engine or suitable client application, formulates and transmits a request to networking system 420. The request generally includes a URL or other document identifier as well as metadata or other information. By way of example, the request may include information identifying the user, such as a user ID, as well as information identifying or characterizing the web browser or operating system running on the user's client computing device 430. The request may also include location information identifying a geographic location of the user's client device or a logical network location of the user's client device. The request may also include a timestamp identifying when the request was transmitted.

Figure 5:
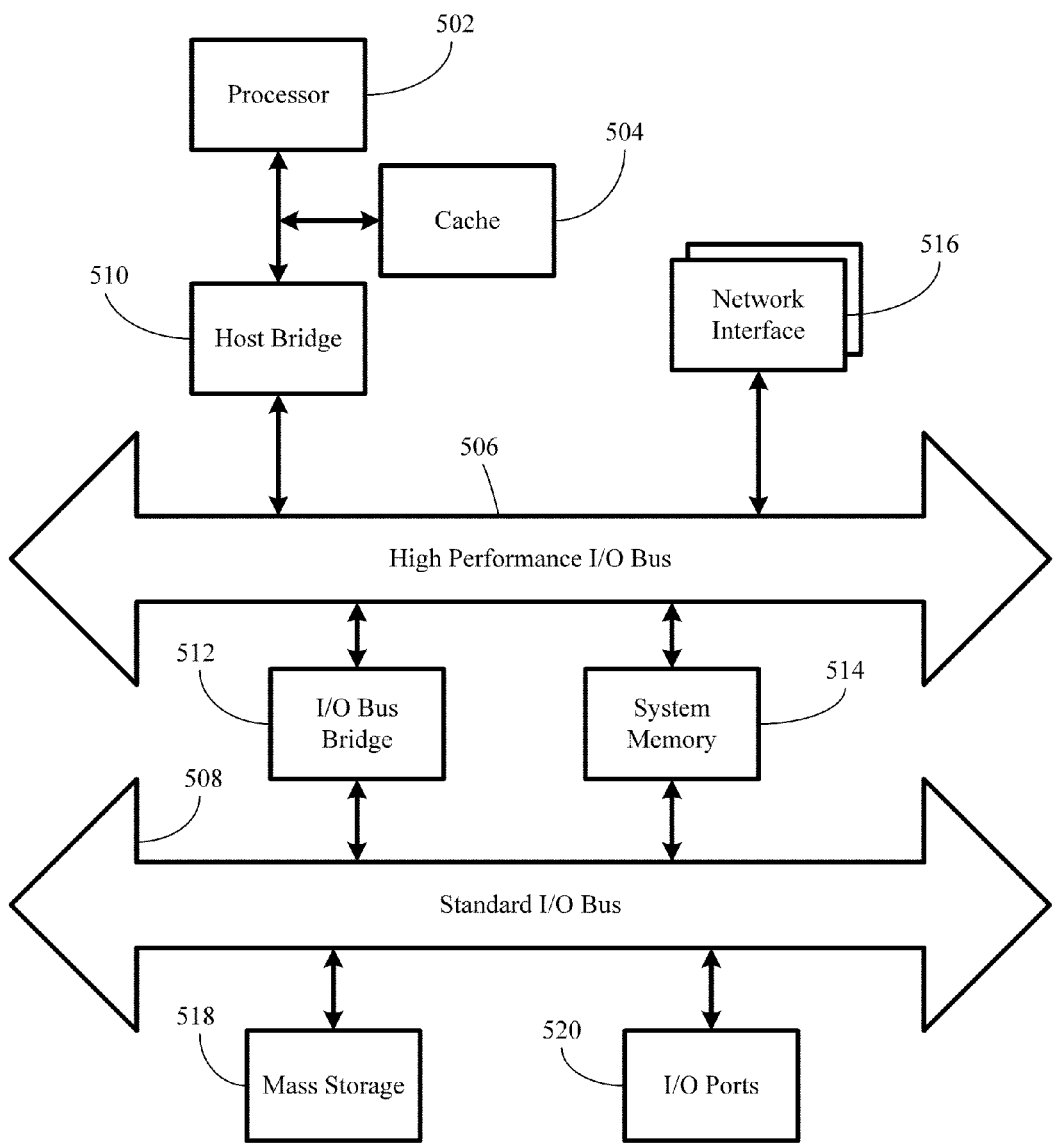
FIG. 5 illustrates an example computer system architecture.

FIG. 5 illustrates an example computing system architecture, which may be used to implement a server 422 or a client device 430. In one embodiment, hardware system 500 comprises a processor 502, a cache memory 504, and one or more executable modules and drivers, stored on a tangible computer readable medium, directed to the functions described herein. Additionally, hardware system 500 may include a high performance input/output (I/O) bus 506 and a standard I/O bus 508. A host bridge 510 may couple processor 502 to high performance I/O bus 506, whereas I/O bus bridge 512 couples the two buses 506 and 508 to each other. A system memory 514 and one or more network/communication interfaces 516 couple to bus 506. Hardware system 500 may further include video memory (not shown) and a display device coupled to the video memory. Mass storage 518, and I/O ports 520 couple to bus 508. Hardware system 500 may optionally include a keyboard and pointing device, and a display device (not shown) coupled to bus 508. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 500 are described in greater detail below. In particular, network interface 516 provides communication between hardware system 500 and any of a wide range of networks, such as an Ethernet (e.g., IEEE 802.3) network, a backplane, etc. Mass storage 518 provides permanent storage for the data and programming instructions to perform the above-described functions implemented in servers 422, whereas system memory 514 (e.g., DRAM) provides temporary storage for the data and programming instructions when executed by processor 502. I/O ports 520 are one or more serial and/or parallel communication ports that provide communication between additional peripheral devices, which may be coupled to hardware system 500.

Hardware system 500 may include a variety of system architectures; and various components of hardware system 500 may be rearranged. For example, cache 504 may be on-chip with processor 502. Alternatively, cache 504 and processor 502 may be packed together as a "processor module," with processor 502 being referred to as the "processor core." Furthermore, certain embodiments of the present invention may not require nor include all of the above components. For example, the peripheral devices shown coupled to standard I/O bus 508 may couple to high performance I/O bus 506. In addition, in some embodiments, only a single bus may exist, with the components of hardware system 500 being coupled to the single bus. Furthermore, hardware system 500 may include additional components, such as additional processors, storage devices, or memories.

An operating system manages and controls the operation of hardware system 500, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the functions described herein may be implemented in firmware or on an application specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the invention.

A recitation of "a", "an," or "the" is intended to mean "one or more" unless specifically indicated to the contrary.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the processes described herein may be implemented using hardware components, software components, and/or any combination thereof. By way of example, while embodiments of the present disclosure have been described as operating in connection with a networking website, various embodiments of the present invention can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A system, comprising:
a data store of game state information corresponding to one or more instances of a computer-implemented game, wherein the computer-implemented game comprises a plurality of user-initiated in-game harvest mechanic actions; and
one or more servers comprising one or more computer processor devices configured to implement a first user interface and a second user interface for the computer-implemented game on client devices associated with respective players over a computer network, the first user interface executed on respective client devices of a device type that provides a first hardware platform, and the second user interface executed on respective client devices that are of a different device type and that provide a second hardware platform;
wherein the one or more servers are configured such that the first user interface provides access to a set of in-game harvest mechanic actions comprising a plurality of actions automatically performable, as a set, responsive to a single player command issued by interaction with a first user interface element forming part of the first user interface, in-game performance of the set of in-game harvest mechanic actions cumulatively resulting in a first game event occurring in the computer-implemented game; and
wherein the one or more servers are configured such that the second user interface provides access to only a first portion of the set of in-game harvest mechanic actions via respective user interface elements forming part of the second user interface, the second user interface being configured to provide no access to a second portion of the set of in-game harvest mechanic actions, performance of the first portion of the set of in-game harvest mechanic actions responsive to respective player commands via the second user interface cumulatively resulting in a second game event occurring in the computer-implemented game, the resulting first game event being equivalent to the resulting second game event, the second game event being presented as one or more display elements via a graphical user interface on a respective client device associated with the second hardware platform.

2. The system of claim 1, wherein each second user interface is accessible by a client system that is a mobile device.

3. The system of claim 2, wherein the first or second user interfaces allow access to one or more in-game harvest mechanic actions in connection with a debit charge to a user account of a user.

4. The system of claim 3, wherein the debit charge is a debiting of a first amount of virtual currency from a game account of the user.

5. The system of claim 3, wherein the debit charge is a debiting of a second amount of legal currency from a financial account of the user.

6. The system of claim 2, wherein the set of in-game harvest mechanic actions comprises one or more initiating actions and one or more collecting actions.

7. The system of claim 6, wherein the first portion of the set of in-game actions excludes one or more initiating actions.

8. The system of claim 7, wherein each second user interface allows access to one or more excluded initiating actions in connection with a debit charge to a user account of a user.

9. The system of claim 6, wherein each second user interface allows access to a single-action collecting action comprising a plurality of collecting actions.

10. The system of claim 9, wherein each second user interface allows access to a single-action collecting action in connection with a debit charge to a user account of a user.

11. A computer-implemented method, comprising:
storing game state information corresponding to one or more instances of a computer-implemented game, wherein the computer-implemented game comprises a plurality of user-initiated in-game harvest mechanic actions; and
implementing, using one or more servers, a first user interface and a second user interface for the computer-implemented game on client devices associated with respective players over a computer network, the first user interface executed on respective client devices of a device type that provides a first hardware platform, and the second user interface executed on respective client devices that are of a different device type and that provide a second hardware platform;
wherein the one or more servers are configured such that the first user interface provides access to a set of in-game harvest mechanic actions comprising a plurality of actions automatically performable, as a set, responsive to a single player command issued by interaction with a first user interface element forming part of the first user interface, in-game performance of the set of in-game harvest mechanic actions cumulatively resulting in a first game event occurring in the computer-implemented game; and
wherein the one or more servers are configured such that the second user interface provides access to only a first portion of the set of in-game harvest mechanic actions via respective user interface elements forming part of the second user interface, the second user interface being configured to provide no access to a second portion of the set of in-game harvest mechanic actions, performance of the first portion of the set of in-game harvest mechanic actions responsive to respective player commands via the second user interface cumulatively resulting in a second game event occurring in the computer-implemented game, the resulting first game event being equivalent to the resulting second game event, the second game event being presented as one or more display elements via a graphical user interface on a respective client device associated with the second hardware platform.

12. The computer-implemented method of claim 11, wherein each second user interface is accessible by a client system that is a mobile device.

13. The computer-implemented method of claim 12, wherein the first or second user interfaces allow access to one or more in-game harvest mechanic actions in connection with a debit charge to a user account of a user.

14. The computer-implemented method of claim 13, wherein the debit charge is a debiting of one of a first amount of virtual currency from a game account of the user and a second amount of legal currency from a financial account of the user.

15. The computer-implemented method of claim 12, wherein the set of in-game harvest mechanic actions comprises one or more initiating actions and one or more collecting actions.

16. The computer-implemented method of claim 15, wherein the first portion of the set of in-game actions excludes one or more initiating actions.

17. The computer-implemented method of claim 16, wherein each second user interface allows access to one or more excluded initiating actions in connection with a debit charge to a user account of a user.

18. The computer-implemented method of claim 15, wherein each second user interface allows access to a single-action collecting action comprising a plurality of collecting actions.

19. The computer-implemented method of claim 18, wherein each second user interface allows access to a single-action collecting action in connection with a debit charge to a user account of a user.

20. A non-transitory computer-readable storage medium storing a set of instructions which, when executed by at least one processor, causes the at least one processor to perform operations, comprising:
   storing game state information corresponding to one or more instances of a computer-implemented game, wherein the computer-implemented game comprises a plurality of user-initiated in-game harvest mechanic actions; and
   implementing, using one or more servers, a first user interface and a second user interface for the computer-implemented game on client devices associated with respective players over a computer network, the first user interface executed on respective client devices of a device type that provides a first hardware platform, and the second user interface executed on respective client devices that are of a different device type and that provide a second hardware platform;
   wherein the one or more servers are configured such that the first user interface provides access to a set of in-game harvest mechanic actions comprising a plurality of actions automatically performable, as a set, responsive to a single player command issued by interaction with a first user interface element forming part of the first user interface, in-game performance of the set of in-game harvest mechanic actions cumulatively resulting in a first game event occurring in the computer-implemented game; and
   wherein the one or more servers are configured such that the second user interface provides access to only a first portion of the set of in-game harvest mechanic actions via respective user interface elements forming part of the second user interface, the second user interface being configured to provide no access to a second portion of the set of in-game harvest mechanic actions, performance of the first portion of the set of in-game harvest mechanic actions responsive to respective player commands via the second user interface cumulatively resulting in a second game event occurring in the computer-implemented game, the resulting first game event being equivalent to the resulting second game event, the second game event being presented as one or more display elements via a graphical user interface on a respective client device associated with the second hardware platform.

21. The non-transitory computer-readable storage medium of claim 20, wherein each second user interface is accessible by a client system that is a mobile device.

22. The non-transitory computer-readable storage medium of claim 21, wherein the first or second user interfaces allow access to one or more in-game harvest mechanic actions in connection with a debit charge to a user account of a user.

23. The non-transitory computer-readable storage medium of claim 22, wherein the debit charge is a debiting of one of a first amount of virtual currency from a game account of the user and a second amount of legal currency from a financial account of the user.

24. The non-transitory computer-readable storage medium of claim 21, wherein the set of in-game harvest mechanic actions comprises one or more initiating actions and one or more collecting actions.

25. The non-transitory computer-readable storage medium of claim 24, wherein the first portion of the set of in-game actions excludes one or more initiating actions.

26. The non-transitory computer-readable storage medium of claim 25, wherein each second user interface allows access to one or more excluded initiating actions in connection with a debit charge to a user account of a user.

27. The non-transitory computer-readable storage medium of claim wherein each second user interface allows access to a single-action collecting action comprising a plurality of collecting actions.

28. The non-transitory computer-readable storage medium of claim 27, wherein each second user interface allows access to a single-action collecting action in connection with a debit charge to a user account of a user.

* * * * *

UNITED STATES PATENT AND TRADEMARK OFFICE
CERTIFICATE OF CORRECTION

PATENT NO. : 9,636,584 B2  Page 1 of 1
APPLICATION NO. : 12/823021
DATED : May 2, 2017
INVENTOR(S) : Lam et al.

It is certified that error appears in the above-identified patent and that said Letters Patent is hereby corrected as shown below:

On the Title Page

Page 2, Column 2, item [56], Line 43, delete "Respones" and insert --Response-- therefor In the Drawings Drawing sheet 5 of 6, Fig. 4, insert --400--

Drawing sheet 6 of 6, Fig. 5, insert --500--

In the Specification

Column 3, Line 46, after "cancel the", insert --processing action, thereby resetting the entire harvest mechanic sequence. During the processing--

Column 6, Line 19, delete "1010" and insert --101-- therefor

Column 8, Line 1, delete "330" and insert --320-- therefor

In the Claims

Column 16, Line 42, in Claim 27, after "claim", insert --24,--

Signed and Sealed this
Twenty-second Day of December, 2020

Andrei Iancu
*Director of the United States Patent and Trademark Office*